Patented Feb. 6, 1923.

1,444,623

UNITED STATES PATENT OFFICE.

JAMES H. MacMAHON, OF SALTVILLE, VIRGINIA, ASSIGNOR TO THE MATHIESON ALKALI WORKS, INC., A CORPORATION OF VIRGINIA.

METHOD OF PRODUCING CARBONATES OF THE ALKALINE EARTH METALS.

No Drawing. Application filed August 20, 1920. Serial No. 404,787.

*To all whom it may concern:*

Be it known that I, JAMES H. MACMAHON, a citizen of the United States, residing at Saltville, in the county of Smyth and State of Virginia, have invented certain new and useful Improvements in Methods of Producing Carbonates of the Alkaline Earth Metals, of which the following is a full, clear, and exact description.

This invention relates to the conversion of inexpensive and abundant compounds of the alkaline earth metals into more valuable compounds. It more particularly relates to a method for this purpose which can be very advantageously practiced in conjunction with the ammonia soda industry.

My invention contemplates the conversion of sulphids of the alkaline earth metals into carbonates of the same metals by first converting them into a soluble compound and then reacting upon the latter with a carbonate of ammonia which produces the desired carbonate of the metal and also a soluble compound of sulphur and ammonia. The ammonia sulphur compound can be readily converted into a more valuable product by reacting upon the same with a hydroxid of an alkali metal to form a sulphid of the alkali metal and liberate the ammonia. The latter may be employed in the ammonia soda industry to regenerate or provide the carbonate of ammonia necessary for use in treating further quantities of the soluble sulphids of the alkaline earth metal.

More particularly I contemplate utilizing my invention in connection with the manufacture of barium compounds. The mineral barytes or barite, which is chiefly barium sulphate, occurs abundantly and is obtainable at a relatively low cost. It is insoluble in water and I first convert it into the soluble sulphid by calcining the same with coal dust, the product being commonly called barium black ash. The barium black ash is then lixiviated in a well known manner and filtered to provide a clear solution of the barium sulphid, and this solution is treated with a carbonate of ammonia, preferably obtained by heating the liquor coming from the bicarbonate filters of the ammonia soda process, to cause a reaction which may be conveniently represented by the following equation when the neutral carbonate of ammonia is employed:

(1) 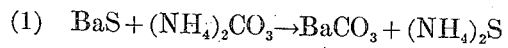

$$BaS + (NH_4)_2CO_3 \rightarrow BaCO_3 + (NH_4)_2S$$

The insoluble barium carbonate resulting from this reaction is washed and filtered, using filter presses, suction filters, etc.

The filtrate from the barium carbonate will contain ammonium sulphid. This may be treated with a quantity of caustic alkali sufficient to form alkali sulphid and free ammonia, (or ammonium hydroxid) according to the equation:

(2) 

$$(NH_4)_2S + 2NaOH \rightarrow Na_2S + 2NH_4OH$$

Upon heating this mixture free ammonia is expelled, which is then returned to the ammonia soda process or utilized in other ways. In the preferred method of practising the invention the ammonia is returned to the ammonia soda process, thus acting through a cycle or series of reactions. After the ammonia has been distilled or expelled, the alkali sulphid solution may be further concentrated in open pans or pots similar to the heavy cast iron pots usually employed in completing the dehydration or "finishing" of caustic alkali. I find that in practice the filtrate from the sodium bicarbonate contains sodium chlorid, ammonium chlorid, ammonium bicarbonate and usually a little sodium sulfate, the latter as an impurity since most natural brines and rock salt contain gypsum. In order to utilize the ammonium bicarbonate in the manner indicated, it is best to expel the ammonium bicarbonate from this saline filtrate. It is well recognized that on heating ammonium bicarbonate solution it is partially broken up forming free carbon dioxid and ammonia, together with some ammonium carbonate which is also markedly volatile. I find it unnecessary to isolate ammonium carbonate since the gas mixture, resulting from heating the saline ammonium bicarbonate filtrate, yields barium carbonate when passed into a solution of barium sulfid. It is immaterial that some excess carbon dioxide passes over with the ammonia since carbon dioxide also precipitates barium carbonate from barium sulfid solutions, forming hydrogen sulfid. In the event that free hydrogen sulfid is formed, it is readily expelled by heating, passing the gas into a caustic alkali scrubber to form alkali sulfid. Theoretically it may be assumed that the following reactions may occur, probably simultaneously:

(3) $NH_4HCO_3 \rightarrow (NH_4)_2CO_3 + H_2O + CO_2$
(4) $BaS + (NH_4)_2CO_3 \rightarrow BaCO_3 + (NH_4)_2S$
(5) $BaS + CO_2 + H_2O \rightarrow BaCO_3 + H_2S$
(6) $(NH_4)_2S + H_2S \rightleftharpoons 2NH_4HS$ Practically, however, it is not necessary to take these possibilities into account since the net result is that desired, i. e., the precipitation of barium carbonate, and the formation of alkali sulfid and free ammonia.

The same net results can be achieved by mixing barium sulfid solution and the saline ammonium bicarbonate solution such as that coming from the bicarbonate filters of the ammonia soda process, the resulting action from which may be conveniently represented by the equation:

(7) $BaS + NH_4HCO_3 = BaCO_3 + NH_4HS$.

The precipitated barium carbonate is filtered off and the solution ammonium hydrogen sulfid expelled by heating, by a current of air, by application of vacuum, or by similar processes or a combination of them, and reacting upon the evolved gas with caustic alkali to form free ammonia and alkali sulfid. It is best to remove the barium carbonate by filtration because if the mixture of finely divided barium carbonate is heated in the solution which contains ammonium chlorid, a further reaction will take place between the latter and the barium carbonate to convert the carbonate into barium chlorid, a result not desired in this method.

When the presence of salt which is always present in the liquor from the bicarbonate filters in the alkali sulfid is not objectionable, or when the alkali sulfid is to be used in the form of an aqueous solution, the filtrate from the precipitated barium carbonate obtained as in equation (7) may be treated with sufficient caustic alkali to expel all of the ammonia, after which the solution will contain salt and alkali sulfid. If desired, it is obvious that the salt can be separated by concentrating and filtering the crystallized salt from the hot solution, substantially in the manner in which salt is separated from caustic alkali, and alkali sulfid permitted to crystallize by cooling the hot filtered solution. When evaporated down to the well known commercial grade, known as fused sodium sulfid, 60% $Na_2S$, this product when made according to the last described method contains a little salt. In other words the separation of salt and sodium sulfid cannot be effected completely by known economic methods, although I find that sodium sulfid made according to this method is sufficiently pure for the requirements of the industries.

The barium carbonate produced in accordance with any of these methods is of exceptional purity and because of its production as a precipitate is in a very finely divided form which is necessary for its use in the manufacture of barium peroxid, and for use as a paper filler, in paint pigments, etc. This uniform finely divided condition cannot be successfully produced by grinding. The ammonia which has been liberated by these reactions may be utilized in the usual ammonia soda process, which process is so well known that a detailed description is believed to be unnecessary and further carbonates of ammonia obtained from the filter liquor thereof for use in treating additional qualities of barium sulfid.

It will thus be seen that while the method of my invention is divisible in its broader aspects from the ammonia soda industry, its operation in conjunction with the soda industry has a very decided economic advantage inasmuch as the free ammonia which is liberated in the reactions occurring subsequent to the precipitation of the barium carbonate can be used in the ammonia soda process and through it, carbonates of ammonia can be regenerated for use in the treatment of further barium sulfid, and consequently the raw materials required are few and comparatively inexpensive.

It will be obvious that various changes in the details of the method may be made by those skilled in the art within the principle and scope of my invention.

I claim:

1. The method for the commercial production of barium carbonate which comprises reacting upon barium sulphid with the carbonate of ammonia in the liquor coming from the bicarbonate filters of the ammonia soda process, to precipitate barium carbonate.

2. The method for the commercial production of barium carbonate which comprises reacting upon barium sulphid with the carbonate of ammonia in the liquor coming from the bicarbonate filters of the ammonia soda process, to precipitate barium carbonate in a solution of ammonium sulphid, and recovering the ammonia from the ammonium sulphid by reacting upon the solution with a caustic alkali to form alkali sulphid and free ammonia.

3. The method for the commercial production of barium carbonate which comprises reacting upon barium sulphid with the carbonate of ammonia in the liquor coming from the bicarbonate filters of the ammonia soda process to precipitate barium carbonate in a solution of ammonium sulphid, recovering the ammonia from the ammonium sulphid by reacting upon the solution with a caustic alkali to form alkali sulphid and free ammonia, and utilizing the ammonia in the ammonia soda process to obtain additional filter liquor for treating further barium sulphid.

In witness whereof, I hereunto subscribe my signature.

JAMES H. MacMAHON.